No. 887,611.
PATENTED MAY 12, 1908.
W. J. EVANS.
MOLD STRIPPER.
APPLICATION FILED OCT. 10, 1907.
2 SHEETS—SHEET 1.
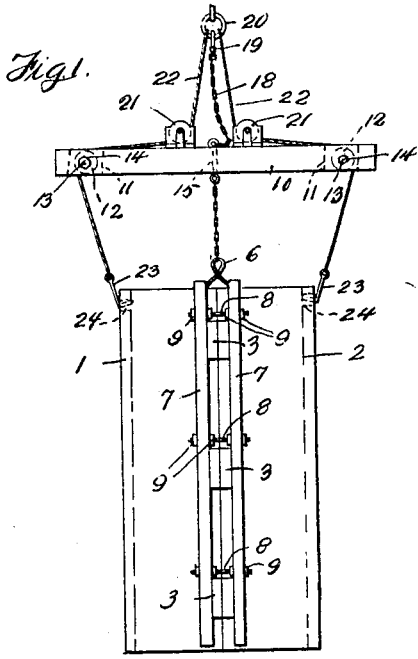
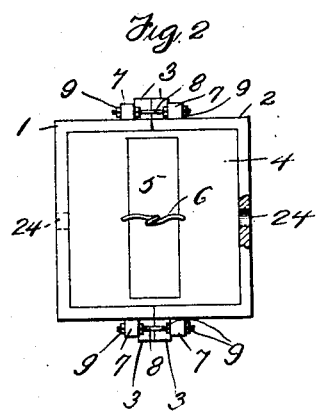
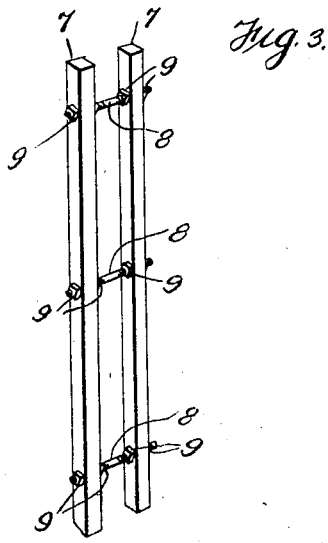
Inventor
W. J. Evans.
Witnesses
By
Attorneys

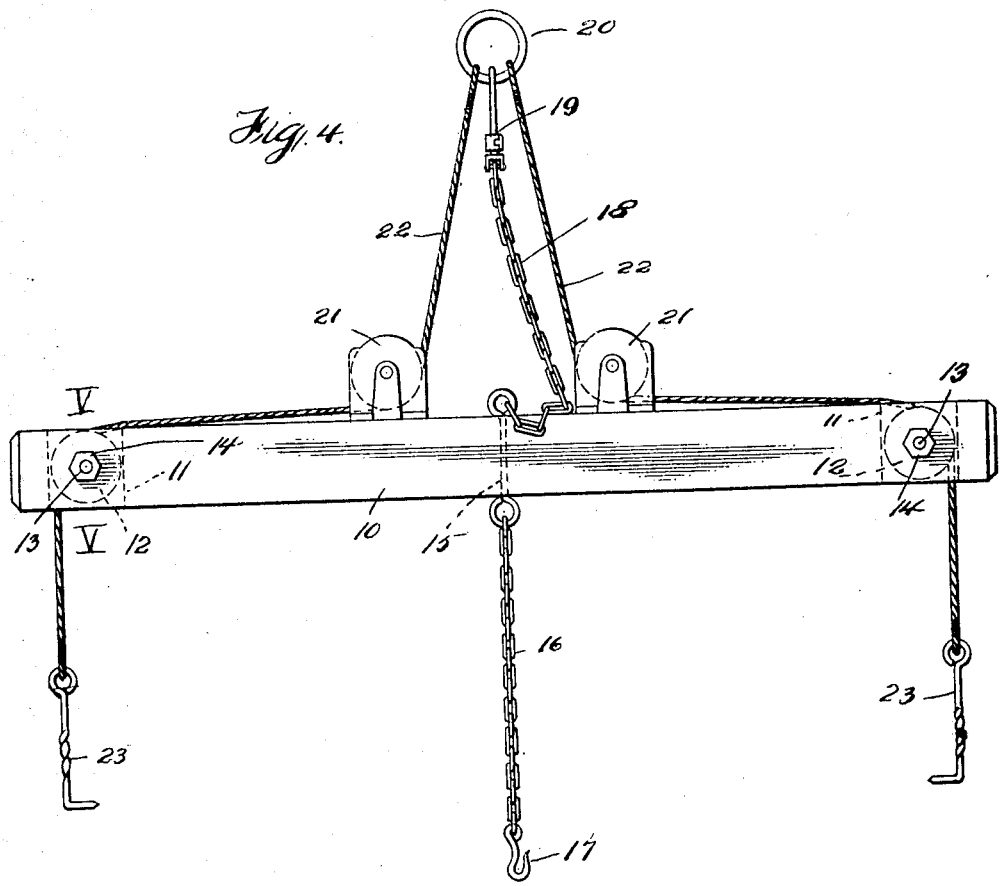

UNITED STATES PATENT OFFICE.

WILLIAM J. EVANS, OF ASPINWALL, PENNSYLVANIA.

MOLD-STRIPPER.

No. 887,611.  Specification of Letters Patent.  Patented May 12, 1908.

Application filed October 10, 1907. Serial No. 396,810.

*To all whom it may concern:*

Be it known that I, WILLIAM J. EVANS, a citizen of the United States of America, residing at Aspinwall, in the county of Allegheny and State of Pennsylvania, have invented certain new and useful Improvements in Mold-Strippers, of which the following is a specification, reference being had therein to the accompanying drawing.
This invention relates to a mold stripper, and more particularly to the separation of the parts of the mold, whereby the molded product can be easily removed.

The invention aims to provide a novel device for gripping the parts of a mold and the products therein, said device being constructed to separate the parts of a mold when they are released, and hold said parts together with the molded product in suspension.
My mold stripping device has been particularly designed for a slab and core holder disclosed in Patent No. 866,446, granted to me September 17th, 1907. This holder is made from a single piece of wire or metal bent to provide yieldable terminals for engaging a slab or core, the holder being suspended from a bar bearing upon the upper face of a mold. After the molded product is sufficiently cool, it is moved by means of the holder, and then the holder sawed or otherwise cut off allowing the terminals to remain as part of the molded product. This holder is used in the present invention in order that the molded product can be supported by my device, while the parts of the mold are being stripped or removed.

To this end, I have devised a stripping device, adapted to be suspended from a crane or suitable hoisting apparatus, the device comprising a cross-head and cables or chains by which said cross head is connected to the mold product or parts of the mold. In connection with the stripping device I use novel frames for retaining the parts of the mold together, these frames, which are easily and quickly placed in engagement with the mold, obviate the necessity of using connecting pins and cotter pins as is now practiced. It is a well known fact that these pin connections for a mold are expensive and cause considerable delay in the stripping of a mold, due principally to the difference in the expansion and contraction of the parts of the mold, the pins and molded product. So by dispensing with these pin connections, and using stripping devices, I not only save considerable labor and expense, but expedite the operation of stripping a mold and produce a more perfect molded product.

The invention will be presently described in detail, and reference will now be had to the drawings.

Figure 1 is an elevation of the stripping device connected to a mold, Fig. 2 is a plan of the mold, Fig. 3 is a perspective view of one of the connecting frames, Fig. 4 is an enlarged elevation of the stripping device, Fig. 5 is a cross sectional view taken on the line V—V of Fig. 4, Fig. 6 is an end view of one of the pulleys detached from the device, and Fig. 7 is an elevation of a snap hook constituting part of the device.

In the accompanying drawings, 1 and 2 designate the parts of a mold having a plurality of protruding pierced lugs 3 at their confronting edges, said lugs being used in connection with pins for securing the parts of a mold together. In the mold I have illustrated a molded product 4 having a soft metal core or center 5, with my holder 6 affixed thereto.

To put my invention into practice, I use frames for securing the lugs 3 of the mold parts 1 and 2 together. Each frame comprises vertically disposed metallic bars 7 connected together by bolts 8 and spaced apart by nuts 9. These frames are adapted to fit over the lugs 3 and retain said lugs together, whereby the mold can be bodily moved, and when it is desired to strip the mold, it is only necessary to knock the frames from said lugs, at which time the parts 1 and 2 can be separated.

The stripping device comprises a cross head 10 having its ends provided with vertically disposed openings 11 in which are journaled grooved pulleys 12, bolts 13 and nuts 14 being used to retain said grooved pulleys within the openings 11. The cross head 10 intermediate its ends is provided with an eye-bolt 15, one end of the eye-bolt being provided with a depending chain 16 carrying a hook 17, while the opposite end of the eye-bolt is connected by a chain 18 and a swiveled snap hook 19 to a ring or link 20, said ring or link being adapted to be connected to a crane (not shown) or similar hoisting device. Upon the cross head 10 adjacent to the eye bolt 15 are mounted two grooved pulleys or sheaves 21 and passing under said pulleys are cables or chains 22, carried by the ring or link 20. The free ends of the cables or chains 22 pass over the grooved pulleys 12 and are provided with hooks 23, these hooks being adapted to engage in openings 24 formed in the mold parts 1 and 2, while the hook 17 of the chain 16 is adapted to engage the holder 6 of the mold proper.

Operation: Assuming that the frames have been removed from the lugs 3 of the mold parts 1 and 2 and that the stripping device has been connected to said mold parts, an upward movement of said device will separate the parts 1 and 2 of the mold, due to the fact that the cross head 10 is of a greater length than the width of the mold and that the hooks 23 are swung inwardly to grip the parts of the mold, consequently when the parts of the mold are released, said parts will swing outwardly, and be held in suspension by the cross head. During this operation the molded product is supported by the chain 16 from the cross head 10, and immediately upon the parts of the mold being separated, the cross head is relieved from the weight of the molded product and the same is supported by the chain 18, which becomes taut by an upward movement of the ring or link 20 and cables 22. I have provided the cross head 10 with the detachable pulleys 12, in order that a new cable or a new hook can be placed upon the stripping device, without detaching the hook from the cable, the opening 11 at each end of the cross head being of sufficient size to permit of the hook passing therethrough.

From the novel construction of my improved stripping device, it will be observed that it is not necessary to wait until the mold sufficiently cools to permit of handling. Heretofore it has been necessary to allow the mold to stand a period of time before the mold could be approached and parts thereof opened. During this time the contraction of the mold would in a great many instances occur with greater rapidity than the molded product, causing the mold to shrink or bind upon the product, hence causing considerable trouble in stripping the mold. These defects and retardation in the operation of stripping a mold are entirely eliminated by the novel construction of my stripping device, in consequence of which the output of a mill is considerably increased, and the laborious work of millmen reduced.

I do not care to confine myself to the disposition of the pulleys and sheaves of the device, and such other changes as are permissible by the appended claims can be resorted to without departing from the spirit and scope of the invention.

Having now described my invention what I claim as new, is:—

1. A stripping device for molds embodying a cross head, pulleys carried thereby, a link, cables connecting with said link and passing over said pulleys, hooks carried by the ends of said cables for engaging said mold, connected chains, one of said chains engaging said link, the other of said chains being adapted to engage the product within said mold.

2. The combination with a two part mold, of a cross head, a link, cables carried by said link and passing through said cross head for connecting with the parts of said mold, and connected chains carried by said link and cross head for holding the product of said mold in suspension.

3. A mold stripping device comprising a cross head, pulleys journaled therein one near each end of the cross head, a pair of sheaves mounted on the cross head, cables passing over said sheaves and pulleys, a link to which one end of each cable is connected, hooks carried by the free ends of said cables, a chain suspended from the cross head intermediate its ends and provided at the free end with a hook, and a chain connected at one end to said cross head and at the other end to said link.

4. In a mold stripping device, the combination with a cross head, of mold suspending cables extending through the cross head, a link to which one end of each cable is connected, means carried by the cross head intermediate its ends for suspending the product within the mold, and means connected to the cross head and to said link for relieving the cross head of the weight of the suspended molded product after the mold is stripped from said product.

5. In a mold stripping device, the combination with a cross head, of mold suspending cables extending through the cross head and provided on their free ends with mold engaging means, a link to which the other end of each cable is connected, a bolt mounted in the cross head and provided on each end with an eye, flexible suspension means connected to the eye on the lower end of said bolt for suspending the product within the mold, a flexible suspension means connected to the eye on the upper end of said bolt and to said link and adapted to relieve the weight of the molded product from the cross beam when the mold suspending means is disengaged from the mold.

In testimony whereof I affix my signature in the presence of two witnesses.

WILLIAM J. EVANS.

Witnesses:
MAX H. SROLOVITZ,
K. H. BUTLER.